United States Patent
Bassett

(10) Patent No.: US 8,656,797 B2
(45) Date of Patent: Feb. 25, 2014

(54) SPINDLE DRIVE

(75) Inventor: Frederick Bassett, Scheidegg (DE)

(73) Assignee: Liebherr-Aerospace Lindenberg GmbH, Lindenberg/Allgau (DE)

( * ) Notice: Subject to any disclaimer, the term of this patent is extended or adjusted under 35 U.S.C. 154(b) by 247 days.

(21) Appl. No.: 12/785,771

(22) Filed: May 24, 2010

(65) Prior Publication Data

US 2010/0300224 A1    Dec. 2, 2010

(30) Foreign Application Priority Data

May 25, 2009    (DE) .......................... 10 2009 022 404

(51) Int. Cl.
    *F16H 25/22*    (2006.01)
(52) U.S. Cl.
    USPC ........ 74/89.23; 74/89.26; 74/89.36; 244/99.2
(58) Field of Classification Search
    USPC .............. 74/89.23, 89.26, 89.36; 324/207.18; 244/99.2
    See application file for complete search history.

(56) References Cited

U.S. PATENT DOCUMENTS

| | | | | |
|---|---|---|---|---|
| 3,472,977 A | * | 10/1969 | Ziegler, Jr. | 200/47 |
| 3,748,417 A | * | 7/1973 | Morino et al. | 200/61.91 |
| 4,717,874 A | * | 1/1988 | Ichikawa et al. | 324/207.16 |
| 5,231,888 A | | 8/1993 | Katahira | |
| 5,669,852 A | * | 9/1997 | Desautels et al. | 477/111 |
| 5,777,467 A | * | 7/1998 | Arms et al. | 324/207.18 |
| 6,685,382 B2 | * | 2/2004 | Capewell et al. | 74/89.23 |
| 7,262,592 B2 | * | 8/2007 | Proksch et al. | 324/207.18 |
| 7,353,723 B2 | * | 4/2008 | Lardy et al. | 74/89.23 |

FOREIGN PATENT DOCUMENTS

| | | | |
|---|---|---|---|
| DE | 60214929 | | 9/2007 |
| EP | 1283384 | | 2/2003 |
| EP | 1398542 | | 3/2004 |
| EP | 1 619 413 | * | 1/2006 |
| FR | 2839352 | | 11/2003 |
| JP | 55-85012 | * | 6/1980 |
| WO | 2009/117750 | | 10/2009 |

\* cited by examiner

*Primary Examiner* — William C Joyce
(74) *Attorney, Agent, or Firm* — Dilworth & Barrese, LLP.

(57) ABSTRACT

A spindle drive has a first load path formed by a first nut which meshes with a threaded bolt and a second load path formed by a second nut which also meshes with the threaded bolt and is arranged to be movable relative to the first nut in an axial direction of the threaded bolt in at least one state of the spindle drive. A sensor unit detects relative movement between the first and second nuts.

15 Claims, 1 Drawing Sheet

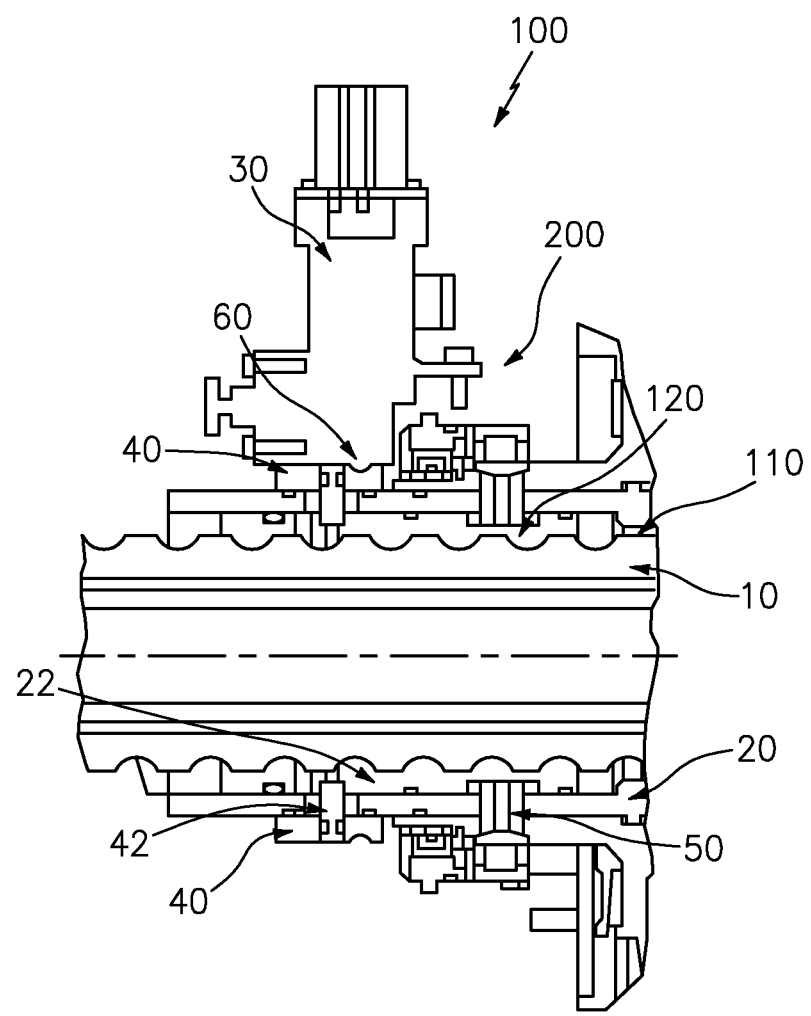

SPINDLE DRIVE

BACKGROUND OF THE INVENTION

The present invention relates to a spindle drive, in particular for the movement of a component such as a flap of an aircraft.

Spindle drives are known in different designs. They effect a movement in translation either of the spindle or of the nut meshing with it to effect a linear movement of the component.

It is in particular important in the control of components of an aircraft that it is ensured that the control capability of the aircraft remains ensured even on a defect of a part of the spindle drive and that the defective actuator remains completely functional or at least partly functional during the remaining flight time.

SUMMARY OF THE INVENTION

It is the underlying object of the present invention to provide a spindle drive which satisfies this object and which, in the event of a defect of one load path, enables an actuation via the other load path and by means of which it is indicated that such a defect event has occurred.

This object is achieved by a spindle drive having the features herein.

Provision is accordingly made that the spindle drive is made with a first load path which includes a first nut which meshes with a threaded bolt and a second load path which includes a second nut which likewise meshes with the threaded bolt and which is arranged such that it is movable relative to the first nut in the axial direction of the threaded bolt in at least one state of the spindle drive, with the spindle drive having a sensor unit which is made such that it detects a relative movement between the first nut and the second nut.

If there is a failure of the first nut or if there is wear of the thread of the first nut or of the threaded bolt, this can result in a relative movement between the first nut and the second nut which is detected by a sensor unit, with the sensor unit in this case being able to emit a signal or the like which indicates the occurrence of a defect event to a user.

The second nut can be arranged at least regionally or completely in the region surrounded by the first nut.

The second nut can be integrated into the first nut.

The second nut can be made as a ring which has a thread on its inner side, said thread preferably corresponding in its design to the internal thread of the first nut.

The thread of the second nut is preferably arranged next to the thread of the first nut, either directly or at a spacing.

In a further embodiment of the invention, at least one activation element, preferably an activation ring, is provided which is moved in the axial direction of the spindle by the relative movement of both nuts, preferably by the axial movement of the second nut.

This activation element can be located outside the region surrounded by the first nut. It can be arranged such that it is displaceably arranged on the outer side of the first nut remote from the threaded bolt.

In a further embodiment of the invention, the activation element extends through a cut-out in the first nut. The connection to the activation element can be achieved by a bolt or the like which extends through the cut-out and is connected to the activation element.

The sensor unit is arranged at fixed position in a preferred embodiment of the invention. It can, for example, be arranged at the housing of the spindle drive.

The sensor unit can be made such that it detects the movement of a piston or the like, with the piston being arranged such that it undergoes a movement on a relative movement between a first nut and a second nut.

It is conceivable that the piston is arranged in the normal operating state in a groove of an element connected to the second nut, preferably in the groove of the named activation element or of the activation ring, and is moved in the radial direction relative to the second nut in the defect event. This piston movement can be detected by the sensor unit.

The first nut is preferably connected to the second nut such that the two nuts are not rotatable relative to one another. Such a rotationally fixed connection can be provided, for example, by one or more pins or the like which connect the two nuts to one another such that the rotational movement of the one nut is transmitted to a rotational movement of the second nut.

Provision can furthermore be made that the threaded bolt has an operating region in which a relative movement between the threaded bolt and the first nut takes place during the usual operation of the spindle drive and that the second nut is arranged such that it is located at least partly outside the operating region when the spindle drive is located in one or both of its end positions. It is conceivable that the second nut exits the operation region in or on both end positions of the spindle drive, i.e. is located in an unloaded thread region of the threaded bolt.

Provision can furthermore be made that the spindle drive is connected to a component whose position is to be changed such as a flap, a rudder, etc. of an aircraft, in particular of an airplane.

The present invention furthermore relates to an aircraft, in particular to an airplane, having at least one spindle drive in accordance with the description herein The terms spindle drive, threaded bolt and nut are to be given a wide interpretation and include a conventional threaded spindle drive in which a nut meshes with the thread of a threaded bolt. It equally includes, however, any other desired spindle drives which work with rolls, rollers, etc. as well as also those in which the rolls, rollers, etc. recirculate, such as e.g. circulating ball spindle drives or threaded spindles.

BRIEF DESCRIPTION OF THE DRAWING

Further details and advantages of the invention will be explained in more detail with reference to an embodiment shown in the drawing.

The only FIGURE shows an end region of a threaded drive in accordance with the present invention. The threaded drive forms a linear actuator.

DESCRIPTION OF THE PREFERRED EMBODIMENTS

A sensor unit is marked by the reference numeral 30 which is present singly and which is arranged outside the first nut 20 and fixedly at a fixed position part such as at the housing 200 of the spindle drive 100. The sensor unit includes an LVDT (linear variable displacement transducer) which is activated by the piston 60, or detects its position, which is moved in dependence on the relative position of the first nut 20 and the second nut 22.

The piston 60 is located in a groove of the activation ring 40. The activation ring 40 or its bolt 42 extends through a bore or a ring gap in the first nut 20, as is shown in the FIGURE.

The spindle drive 100, which is only shown in its one end region in the FIGURE is located between the aircraft structure and the component to be moved such as a flap, a rudder or the like.

The maximum wear of a linear actuator in accordance with the invention is restricted to the operating region 110 in which a relative movement between the nut 20 and the threaded bolt 10 is present. If the second nut 22 is arranged such that it is arranged outside this loaded region 110 in the end position of the spindle drive 100, this results in a relative movement between both nuts 20, 22 which can be detected by the sensor 30.

Since the first nut 20 rotates once for each unit of the movement in translation, this has the result that the first nut 20 runs through a plurality of revolutions when the spindle drive executes a stroke and in so doing sweeps over a plurality of thread pitches of the threaded bolt 10. A greater degree of wear will therefore arise in the first nut 20 than applies to the threaded bolt 10.

The first nut 20 forms the first load path and the second nut 22 forms the second load path. The first nut 20 and the second nut 22 are made such that they are movable axially with respect to one another. This axial movement is sufficient to be detected directly or indirectly by the sensor 30. A free axial movement of the second nut 22 is, however, prevented by its internal thread with which it meshes with the external thread of the threaded bolt 10.

The first nut 20 and the second nut 22 are oiled and run together on the threaded bolt 10. They are sealed with respect to the environmental atmosphere so no moisture, dirt or the like can penetrate.

If a failure of the loaded thread pitches of the first nut 20 and/or of the threaded bolt 10 occurs in the region beneath the first nut 20, there is a relative axial movement between the first nut 20 and the threaded bolt 10. The second nut 22, which is located, for example, in a region 120 of the threaded spindle 10 which is not loaded or which does not belong to the operating region of the threaded spindle 10, remains stationary on the said axial displacement of the first nut 20. There is thus a relative axial movement between the nuts 20, 22 and thus also between the activation ring 40 and the fixed-position sensor unit 30. The piston 60 thereby undergoes an axial movement taking place in the piston direction away from the groove axis of the activation ring 40 and, depending on the amount of the relative movement between both nuts 20, 22, leaves the groove located in the activation ring 40.

This movement of the piston 60 is detected by the sensor unit 30.

Due to the failure of the thread pitches beneath the first nut 20, the load is transmitted to the intact thread pitches in the region of the second nut 22 and by the connection pins 50 to the first nut, whereby the second load path is formed.

If a wear of the thread pitches of the threaded bolt 10 occurs, this can, for example, be recognized when the spindle drive 100 is located at an end of its operating region. In so doing, the second nut 22 leaves the loaded region, i.e. the operating region 110 and is located in a region 120 of non-loaded thread pitches of the threaded spindle 10.

The play which now occurs between the nuts 20, 22 can be detected as a relative axial movement of the second nut 22.

This relative movement in the axial direction between the nuts 20, 22 and thus between the activation ring 40 and the sensor unit 30 results—as described above—in a movement of the piston 60 which is detected by the sensor unit 30.

If excessive wear of the thread pitches of the first nut 20 occurs, this can be detected in any region of the threaded bolt 10. For the wear of the thread pitches of the first nut 20 relative to that of the thread pitches of the threaded bolt 10 results in a relative movement of the nuts 20, 22 relative to one another and thus also in a movement of the activation ring 40 relative to the sensor unit 30. This results, as stated above, in a movement of the piston 60 which is detected by the sensor unit 30.

The invention claimed is:

1. A spindle drive (100) having
    a threaded bolt (10),
    a first load path which includes a first nut (20) which meshes with the threaded bolt (10),
    a second load path which includes a second nut (22) which meshes with the threaded bolt (10) and is arranged to be movable relative to the first nut (20) in an axial direction of the threaded bolt (10) in at least one state of the spindle drive (100),
    a sensor unit (30) configured to detect a relative movement between the first (20) nut and the second nut (22),
    a piston (60) configured to move upon the relative movement between the first and second nuts (20, 22), and
    an element (40) connected to the second nut (22) an having a groove, wherein
    the sensor unit (30) includes an LVDT (linear variable displacement transducer) activated by the piston (60) to detect position of the piston (60), and
    the piston (60) is arranged, in a normal operating state, in the groove of the element (40) connected to the second nut (22) and moves in event of a defect, in a radial direction relative to the second nut (22).

2. A spindle drive (100) in accordance with claim 1, wherein the element (40) is moved in the axial direction of the spindle by the axial movement of the second nut (22).

3. A spindle drive (100) in accordance with claim 2, wherein the element (40) is located outside the region surrounded by the first nut (20).

4. A spindle drive (100) in accordance with claim 2, wherein the element (40) is arranged such that it is displaceably arranged on the outer side of the first nut (20) remote from the threaded bolt (10).

5. A spindle drive (100) in accordance with claim 2, wherein the element (40) extends by a bolt (42) through a cut-out in the first nut (20).

6. A spindle drive (100) in accordance with claim 2, wherein the element (40) is an activation ring.

7. A spindle drive (100) in accordance with claim 1, wherein the sensor unit (30) is arranged in a fixed position.

8. A spindle drive (100) in accordance with claim 1, wherein the first nut (20) is connected to the second nut (22) such that the two nuts (20, 22) are not rotatable relative to one another.

9. A spindle drive (100) in accordance with claim 8, wherein one or more pins (50) are provided which connect the two nuts (20, 22) rotationally fixedly to one another.

10. A spindle drive (100) in accordance with claim 1, wherein the threaded bolt (10) has an operating region (110) in which, during the usual operation of the spindle drive (100), a relative movement takes place between the threaded bolt (10) and the first nut (20); and the second nut (22) is arranged such that it is located at least partly outside the operating region (110) when the spindle drive (100) is located in one of its end positions.

11. A spindle drive (100) in accordance with claim 1, wherein the spindle drive (100) is connected to an aircraft component whose position is to be changed.

12. A spindle drive (100) in accordance with claim 11, wherein the aircraft component is a flap or rudder.

13. An aircraft having at least one spindle drive (100) in accordance with claim 1.

14. A spindle drive (100) in accordance with claim 1, wherein the first and second nuts (20, 22) are concentrically arranged with respect to one another.

15. A spindle drive (100) in accordance with claim 14, wherein the second nut (22) is at least partially-surrounded by the first nut (20).

* * * * *